(No Model.)
E. H. & A. H. COWLES.
ELECTRIC FURNACE FOR METALLURGIC OPERATIONS.
No. 335,059. Patented Jan. 26, 1886.
FIG. I.
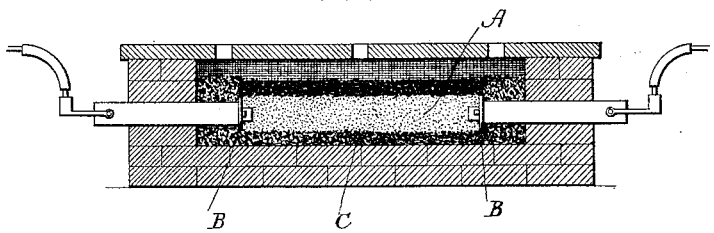
FIG. II.
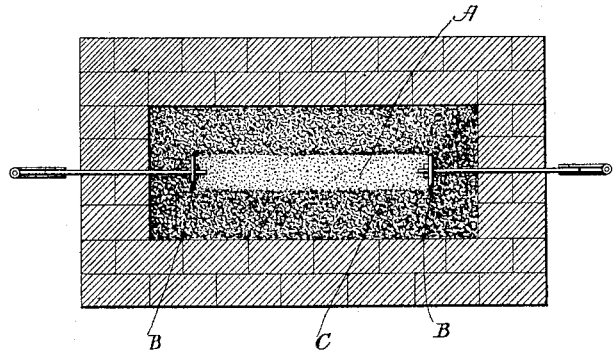
Attest:
Geo. T. Smallwood,
Jas. K. McCathran.
Inventors.
Eugene H. Cowles
and Alfred H. Cowles
By Paine & Ladd,
Attys

UNITED STATES PATENT OFFICE.

EUGENE H. COWLES AND ALFRED H. COWLES, OF CLEVELAND, OHIO.

ELECTRIC FURNACE FOR METALLURGIC OPERATIONS.

SPECIFICATION forming part of Letters Patent No. 335,059, dated January 26, 1886.

Application filed August 22, 1885. Serial No. 175,099. (No model.)

*To all whom it may concern:*

Be it known that we, EUGENE H. COWLES and ALFRED H. COWLES, citizens of the United States, residing at Cleveland, in the county of Cuyahoga and State of Ohio, have invented certain new and useful Improvements in Electric Furnaces for Metallurgic Operations; and we do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

This invention relates to the construction of the interior walls of furnaces in which metallurgical operations are performed by means of electricity, and particularly to the class of furnaces wherein a lining of powdered charcoal or like material immediately surrounds the charge; and this invention consists in treating the material of which the said interior walls are usually composed with chemical substances, or in substituting for the said material a mixture which is not deteriorated so quickly by the action of the heat and electricity.

Prior to this invention the interior walls of electric furnaces have been made of finely-powdered material that is a poor conductor both of heat and electricity, charcoal being preferably used, that material being a bad conductor of both heat and electricity and very suitable for the purpose. These interior walls protect the outer walls of fire-brick or other material, and form a lining of considerable thickness, which protects the charge. It has, however, been found, in the practical working of electric furnaces, that the fine carbon heretofore used to separate the charge from the walls becomes baked and hardened when the furnace has been for some time in operation, and that after a certain number of heats its density becomes so much increased and its structure otherwise so changed, from being subjected to the intense heat and the action of the current, that it loses in a measure its insulating character.

According to our present invention we treat the finely-pulverized charcoal with certain chemicals, or substitute therefor a mixture of any finely-divided materials of such a character that the temperature of reduction of the interior walls, when formed of the same, will be above that of the material being acted upon by the current in the furnace.

In selecting substances to form the mixture of which the interior walls are to consist, we choose those, by preference, which would not deteriorate the products obtained from the furnace, should any chance or partial reduction of them take place, and we also select those substance which, if reduced by the heat of the furnace, would be volatilized and driven away from the center of the furnace without coming in contact with the charge. Water impregnated with lime is preferably used for the above-described purpose. The finely-powdered charcoal is soaked in this until the surfaces of all the particles are covered with calcium oxide, which also penetrates into the pores of the larger particles and renders the charcoal more refractory in its resistance to heat and considerably increases its resistance to the flow of the electric current.

When the interior furnace-walls are constructed of charcoal thus prepared, they will last for a much longer time, and the work which can be done within them by a given amount of electrical energy is very much increased.

Other chemicals may be used in place of lime, which will have a similar effect upon the powdered charcoal. Water containing the gelatinous hydrated oxide of aluminium may be used, and also other substances of a similar nature.

Instead of washing or soaking the charcoal in an aqueous solution, a mixture may be formed of charcoal and lime, both in a finely-pulverized state, and the interior furnace-walls may be constructed of this mixture; or a mixture of finely-pulverized charcoal and powdered oxide of aluminium may be used to effect the same results and make the walls very poor conductors of both heat and electricity. The presence of the fine particles of lime or like material through the mass of powdered charcoal prevents the latter from caking and solidifying.

In the accompanying drawings, Figure I is a transverse section through an electric furnace. Fig. II is a horizontal section through the same.

A is the charge to be reduced; B, the electrodes, between which the charge is placed.

C is the furnace-lining, which keeps the charge from contact with the furnace-walls.

Having thus described our invention, what we claim as new, and desire to secure by Letters Patent, is—

1. In an electric furnace in which the current passes through the charge, a lining for the walls of the furnace, consisting of a mixture of charcoal and a refractory material which is a poor conductor of electricity, both being in a a finely-divided condition, substantially as and for the purpose set forth.

2. A lining for the walls of an electric furnace, consisting of finely-divided charcoal previously prepared by soaking it in water impregnated with lime, substantially as and for the purpose set forth.

3. A lining for the walls of an electric furnace, consisting of a homogeneous mixture of charcoal and lime, both of which are in a finely-divided condition, substantially as and for the purpose set forth.

In testimony whereof we affix our signatures in presence of two witnesses.

EUGENE H. COWLES.
ALFRED H. COWLES.

Witnesses:
JOHN C. HOBBS,
E. H. PERDUE.